(12) United States Patent
Poon et al.

(10) Patent No.: US 8,762,411 B2
(45) Date of Patent: Jun. 24, 2014

(54) PROGRESSIVE EXPLORATION OF DATA RELATIONSHIPS

(75) Inventors: Madison Poon, Vancouver (CA); Ryan Hanna, Vancouver (CA); Ashley Gadd, Vancouver (CA); Chun Pong Chan, Richmond (CA); Julian Gosper, Vancouver (CA); Sylvie Denis, Mery sur Oise (FR)

(73) Assignee: SAP AG, Walldorf (DE)

( * ) Notice: Subject to any disclaimer, the term of this patent is extended or adjusted under 35 U.S.C. 154(b) by 314 days.

(21) Appl. No.: 12/957,640

(22) Filed: Dec. 1, 2010

(65) Prior Publication Data

US 2012/0089631 A1    Apr. 12, 2012

(30) Foreign Application Priority Data

Oct. 8, 2010   (EP) .................................... 10290554

(51) Int. Cl.
*G06F 7/06*  (2006.01)
*G06F 17/30* (2006.01)
*G06F 17/22* (2006.01)

(52) U.S. Cl.
CPC .... *G06F 17/30002* (2013.01); *G06F 17/30345* (2013.01); *G06F 17/2247* (2013.01)
USPC ............ 707/778; 707/769; 707/776; 707/796

(58) Field of Classification Search
CPC ................... G06F 17/30345; G06F 17/30002; G06F 17/2247
USPC ......... 707/999.003, 999.005, 999.1, 999.102, 707/999.107, 755, 769, 776, 778, 796
See application file for complete search history.

(56) References Cited

U.S. PATENT DOCUMENTS

| 2003/0131007 | A1* | 7/2003 | Schirmer et al. | 707/100 |
| 2005/0108262 | A1* | 5/2005 | Fawcett et al. | 707/100 |
| 2006/0242164 | A1* | 10/2006 | Evans et al. | 707/100 |
| 2006/0288023 | A1* | 12/2006 | Szabo | 707/100 |
| 2013/0346242 | A1* | 12/2013 | Maytal | 705/26.35 |

* cited by examiner

*Primary Examiner* — Bruce Moser
(74) *Attorney, Agent, or Firm* — Kenyon & Kenyon LLP

(57) ABSTRACT

Parental dependency information for various data fields may be analyzed to create a data field hierarchy. Each of the data fields may be presented in a selectable list through an interface. Once a data field is selected, any immediate parent(s) and/or child(ren) field(s) of the active data element may be demarcated in the list according to the hierarchy. Additional data entry fields relating to the selected data field and its familial fields may also be displayed. Data in each of data fields may also be analyzed to identify fields with incomplete data. Systems and methods are provided.

14 Claims, 8 Drawing Sheets

Exemplary Prompt 201

Summary Interface 210
- Entity 111
- Region 112
- Team 113
- Name 114

- Country 121
- Region 124
- Department 122
- Manager 125
- Line 123
- Brand 126
- Customer 127

Data Entry Interface 220

Enter Entity: 221 [Subsidiary A v]
Enter Region: 222 [ v]
...
Enter Name: 224 [ v]
...
Enter Country: 231 [Germany v]
Enter Region: 232 [ v]
...

[Cancel] [Run]

PROGRESSIVE EXPLORATION OF DATA RELATIONSHIPS

CROSS-REFERENCE TO RELATED APPLICATIONS

This application claims the benefit of European patent application Serial No. 10290554.4, filed Oct. 8, 2010, hereby incorporated by reference.

BACKGROUND

Many organizations rely on databases and data sources that store data hierarchically. In some instances, business process data may be stored and processed hierarchically to reflect a chronological sequence of steps in the business process. The steps associated with processing a sales order, for example, may involve first identifying a customer and/or products to be sold, then selecting a quantity of the products, followed by processing payment information, and then shipping the order with an invoice, if necessary. These steps may be sequential and hierarchical because the order cannot be shipped, for example, until the products and customer have been identified.

Data records in a database may also be organized hierarchically. For example, each customer record containing information identifying different customers, such as customer names, addresses, billing information, zip codes, and so on, may be linked to one or more sales order records identifying products ordered by the respective customer on each occasion. Thus, the customer record may be parent record, and each linked sales order record may be child record linked to the parent customer record.

Data searches may also be conducted hierarchically. For example, when searching for specific data in a database, a user may first be prompted to enter information concerning a first field. A search for records matching the first field may be conducted, at which point the user may be prompted to enter information concerning a second field. A further search of records matching the first field may be conducted to identify a subset of those matching first field records that also have matching second field entries. The search may be classified as hierarchical because information in the first field of the data records are initially searched before information in the second field.

Figure 1A:
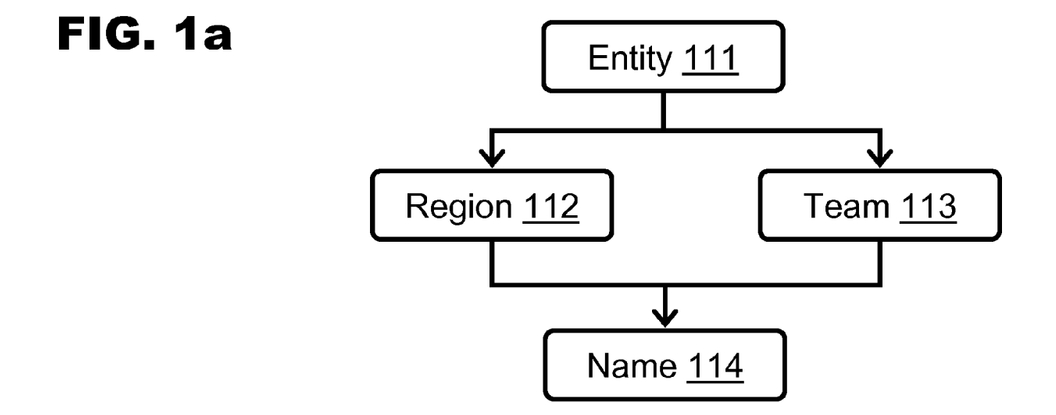
FIGS. 1a and 1b show two exemplary complex hierarchical relationships between data elements involving one-to-many relationships.
Figure 1B:
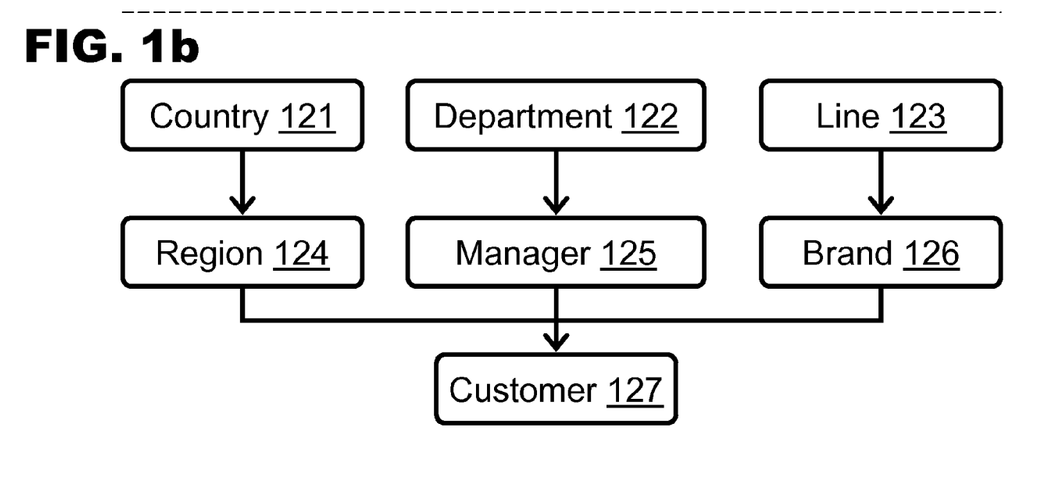

While simple hierarchical relationships between data, such as a simple one parent to one child relationship may be organized in a tree structure in an interface, with the child represented as a node branching from the parent, existing hierarchical data relationship organizational schemes become cluttered and/or non-functional as the hierarchical relationships between data elements become more complex. For example, existing visualization scheme are unable to accommodate a child data field originating from multiple parent elements, such as shown in FIG. 1, or multiple child fields spawning from a single parent. Even if the existing visualization schemes could be modified to accommodate a one-to-many relationship between parent-child data elements, it is still desirable to show the relationship in an intuitive and simple manner so that end users may readily understand the relationship between the data elements.

Accordingly, there is a need for a data element relationship visualization scheme that is able to intuitively depict complex hierarchical relationships between data elements in a workflow.

DETAILED DESCRIPTION

In an embodiment of the invention, parental dependency information for various data fields may be analyzed to create a data field hierarchy. Each of the data fields may be presented in a selectable list through an interface. Once a data field in the list is selected, any immediate parent(s) and/or child(ren) field(s) of the active data element may be demarcated in the list according to the hierarchy. Additional data entry fields relating to the selected data field and its familial fields may also be displayed. Data in each of data fields may also be analyzed to identify fields with incomplete data.

In some instances, only data fields with incomplete data may be displayed in the data entry interface. Ancestor and descendent fields of the incomplete data fields may also be displayed in the data entry interface to resolve the incompleteness. The data entry fields may be displayed in a manner that encourages data entry in a designated sequential order. For example, if data is intended to be entered in a parent field first, then the non-parent fields may be grayed-out or otherwise unreceptive to input until the parent field is supplied with the requisite information.

Limiting visual indicators in the data field list to only immediate family members of an active data element may reduce clutter and confusion in those embodiments using complex hierarchical relationships between data elements. Similarly, limiting the data displayed in the data entry interface to ancestor and/or descendents of a particular data field may also reduce clutter and confusion in embodiments using complex hierarchical relationships. A complex hierarchical relationship may include non-linear relationships, such as one-to-many parent-child or child-parent relationship.

FIG. 1 shows two exemplary complex hierarchical relationships between data elements involving one-to-many relationships. In FIG. 1a, an entity field 111 may be a parent of two child fields, region field 112 and team field 113. Both region field 112 and team field 113 may be parents of name field 114. The hierarchy shown in FIG. 1a may be used, for example, when processing a data search request in an embodiment.

According to the hierarchy shown in FIG. 1a, a user would first enter a search criterion to search organizational entity field 111. Once the search criterion for the organizational entity field 111 has been entered, the search results may be further limited to a particular region, by entering a search criterion for region field 112, or to a particular team, by entering search criterion for team field 113. Once at least one further criterion has been entered in either the region field 112 or team field 113, the search results may be further limited by entering an additional search criterion for name filed 114.

In some embodiments, a user may not enter data in a child field unless data is first entered in a parent field. Thus, a user may submit data for name field 114 only after data has been submitted for at least one of region field 112 or team field 113. A user may submit data for either region field 112 or team field 113 only after data has been submitted for entity field 111.

In some embodiments, data may be submitted in any order. In other embodiments, data may be submitted in a particular order, such as data for name field 114 provided before entity 111. In yet other embodiments, incomplete data may be submitted, such as data for entity field 111 and name field 114 but not region field 112 or team field 113. In each of these instances, the data that is submitted may be processed hierarchically, with parent data processed before child data. In other instances, the submitted data may be processed reverse hierarchically, with child data processed before parent data.

FIG. 1b shows a second exemplary complex hierarchical relationship between data elements involving one-to-many relationships. In FIG. 1b, a country field 121 may be a parent of region field 124, a department field 122 may be a parent of manager field 125, and a product line field 123 may be a parent of brand field 126. Region field 124, manager field 125, and brand field 126 may all be parents of customer field 127.

In a search context, for example, this may mean that customers may be identified by searching country and region fields 121 and 124, department and manager fields 122 and 125, and product line and brand fields 123 and 126 independently. Customers may be identified and/or narrowed by cross-functional searches, by for example, searching country and region fields 121 and 124 while also search product line and brand fields 123 and 126.

Figure 2:
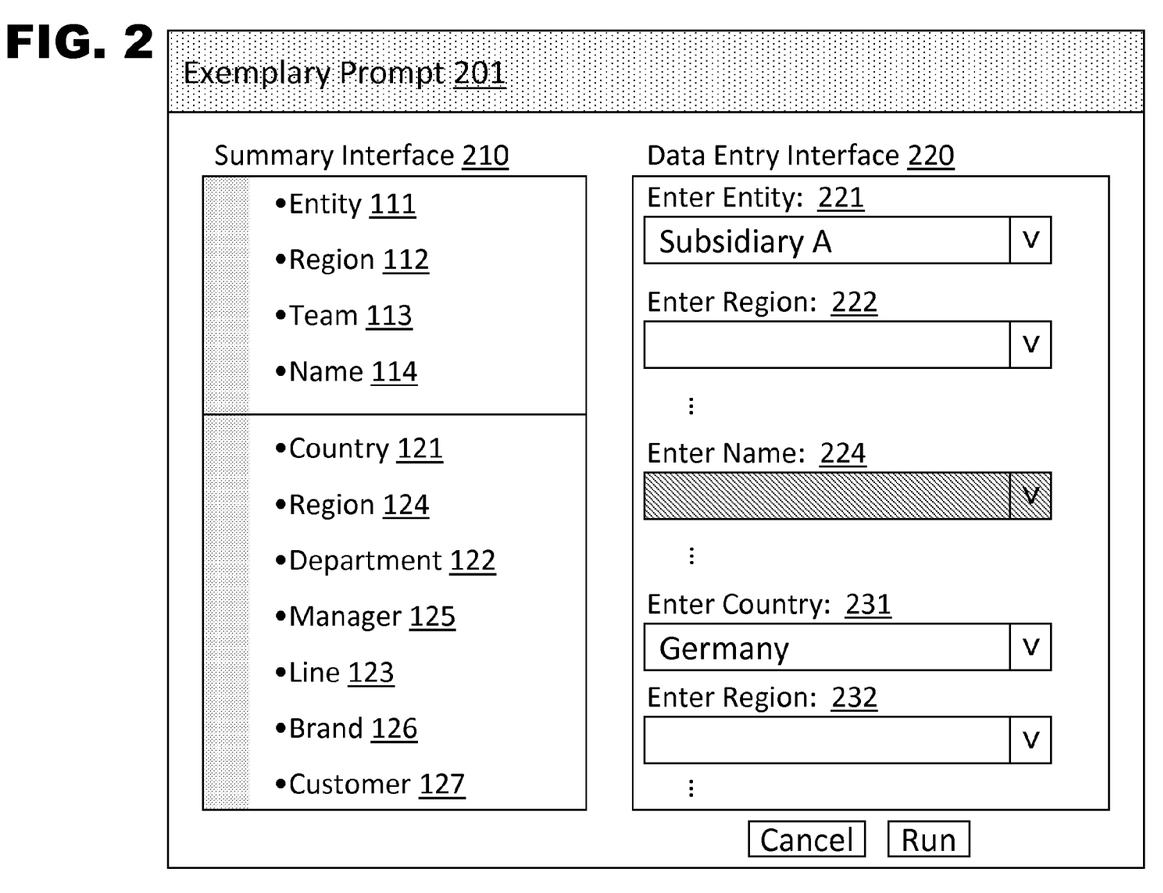
FIG. 2 shows exemplary interfaces in an embodiment of the invention.

FIG. 2 shows exemplary interfaces in a prompt 201 when executing a process involving the data fields and field relationships shown in FIG. 1. A prompt 201 may include one or more visual interfaces for enable predetermined steps in a process to be executed. A prompt 201 may include a summary interface 210 and a data entry interface 220, each of which may be periodically updated to reflect changes during process execution.

The summary interface 210 may initially list each of the data fields involved in a process. The summary screen in FIG. 2, for example, lists each of data fields that may be involved in the process associated with prompt 201, as shown in FIG. 1. Thus, the summary screen 210 lists entity field 111, region field 112, team field 113, and name field 114 in a first field summary section corresponding to the fields in FIG. 1a, and the summary interface 210 also lists country field 121, region field 124, department field 122, manager field 125, product line field 123, brand field 126, and customer field 127 in a second field summary section corresponding to the fields in FIG. 1b.

The data entry interface 220 may provide an interface for display, entering, or modifying values associated with the fields shown in the summary interface 210. In some instances, only a subset of fields shown in the summary interface 210 may be shown for display, entering, and/or modifying in the data entry screen 220. The data entry fields in the data entry interface 220 may vary depending on the hierarchical relationship between the fields. For example, if the hierarchical relationship requires parent data fields to be entered before child fields, then the data entry screen 220 may wait to display child fields until the parent data has been entered.

Alternatively, the child fields may be grayed out or otherwise demarcated to distinguish them from the parent fields. The selection and/or demarcation of data entry fields presented in the data entry interface 220 may vary depending on the number of data fields included in the summary interface 210. If the data field elements in a particular section or grouping of data elements is below a threshold, then each of the data entry elements for those fields may be displayed in the data entry interface 220. If the threshold is exceeded, then the number of data elements displayed in the data entry interface 220 may be limited by other factors. For example, the data elements displayed in the data entry interface 220 may be limited to some or all parent/ancestor fields. Alternatively, data elements may be limited to some or all child fields or a combination of certain parent/child fields. Different embodiments may display different data elements in the data entry interface 220.

In FIG. 2, the data entry interface 220 shows exemplary data entry fields with pull-down menus to either manually enter a value, such as subsidiary in the entity field 221, or select a value from a pull-down menu. The data entry interface 220 may include a entity data field 221 corresponding to entity field 111, a region data field 222 corresponding to region field 112, a name data field 224 corresponding to name field 114, which may be grayed-out as shown because not all parent data fields have been supplied with data, country data field 231 corresponding to country field 121, and region data field 232 corresponding to region field 124, among others.

Figure 3:
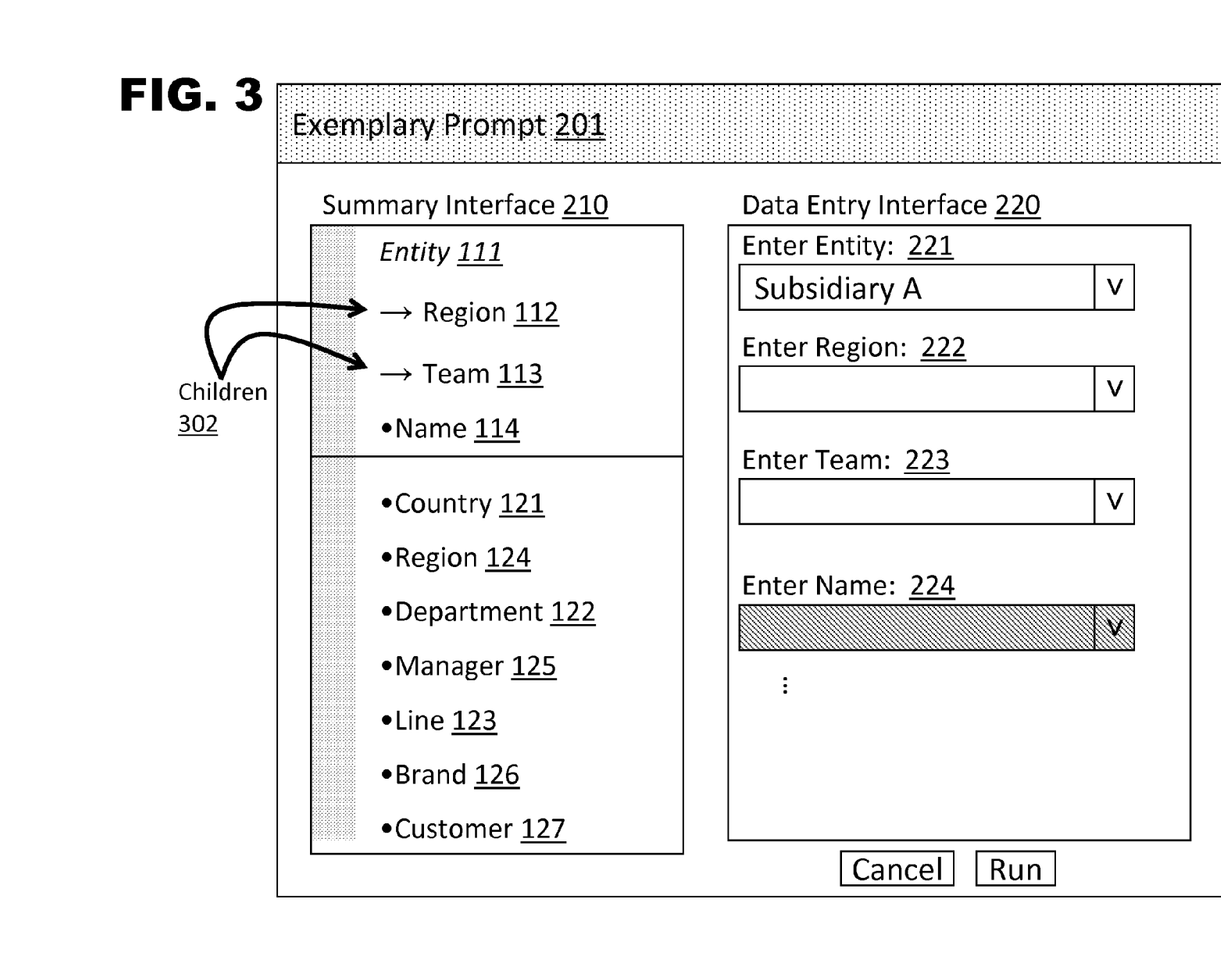
FIG. 3 shows an exemplary change in interfaces after selecting the entity field in a summary interface of an embodiment.

FIG. 3 shows an exemplary change in interfaces after selecting the entity field 111 in summary interface 210 in an embodiment. As discussed previously, in an embodiment of the invention, once a field in the summary interface is selected and becomes active, the summary interface 210 may be modified to visually indicate any immediate parent(s) and/or child (ren) of the active field. Thus, if entity field 111 is selected in the summary interface 210, then the interface 210 may be modified to show its immediate parents and children.

Since, as indicated in FIG. 1, the entity field has no immediate parents, the interface may be modified to show only the child fields 302, such as region field 112 and team field 113. These child fields 302 may be indicated in an embodiment by being indented and preceded by an arrow, as shown in FIG. 3, though other embodiments may use different differentiation styles, formats, or techniques. For example, instead of indenting and inserting an arrow, as shown in FIG. 3, the colors of child fields 302 may be changed to distinguish them. Alternatively, the size of fields may be changed or a child icon may be inserted next to the fields. Any other field differentiating technique may also be used in different embodiments.

The data entry interface 220 may also be updated to show data entry fields corresponding to the selected field in the summary interface 210. Thus, data entry interface may show data entry fields for displaying, entering, or modifying data associated with the entity field 111. In some embodiments, one or more parent or child data entry fields may also be shown.

In this example, as shown in FIG. 1a, the region field 112, team field 113, and name field 114 are all children of entity field 111. Thus, one or more of the data entry fields corresponding to these fields may also be shown in the data entry interface 220. In this example, the name data entry field 224 is shown as grayed out because a requisite condition for data entry, in this case supplying values for at least one parent field, such as region fields 112/222 or team fields 113/223, has not been completed. Once the requisite condition is satisfied, the grayed-out field may be restored. Other embodiments may not gray-out fields or require that data be entered in a hierarchical order consistent with a provided data structure, such as those shown in FIG. 1.

Figure 4:
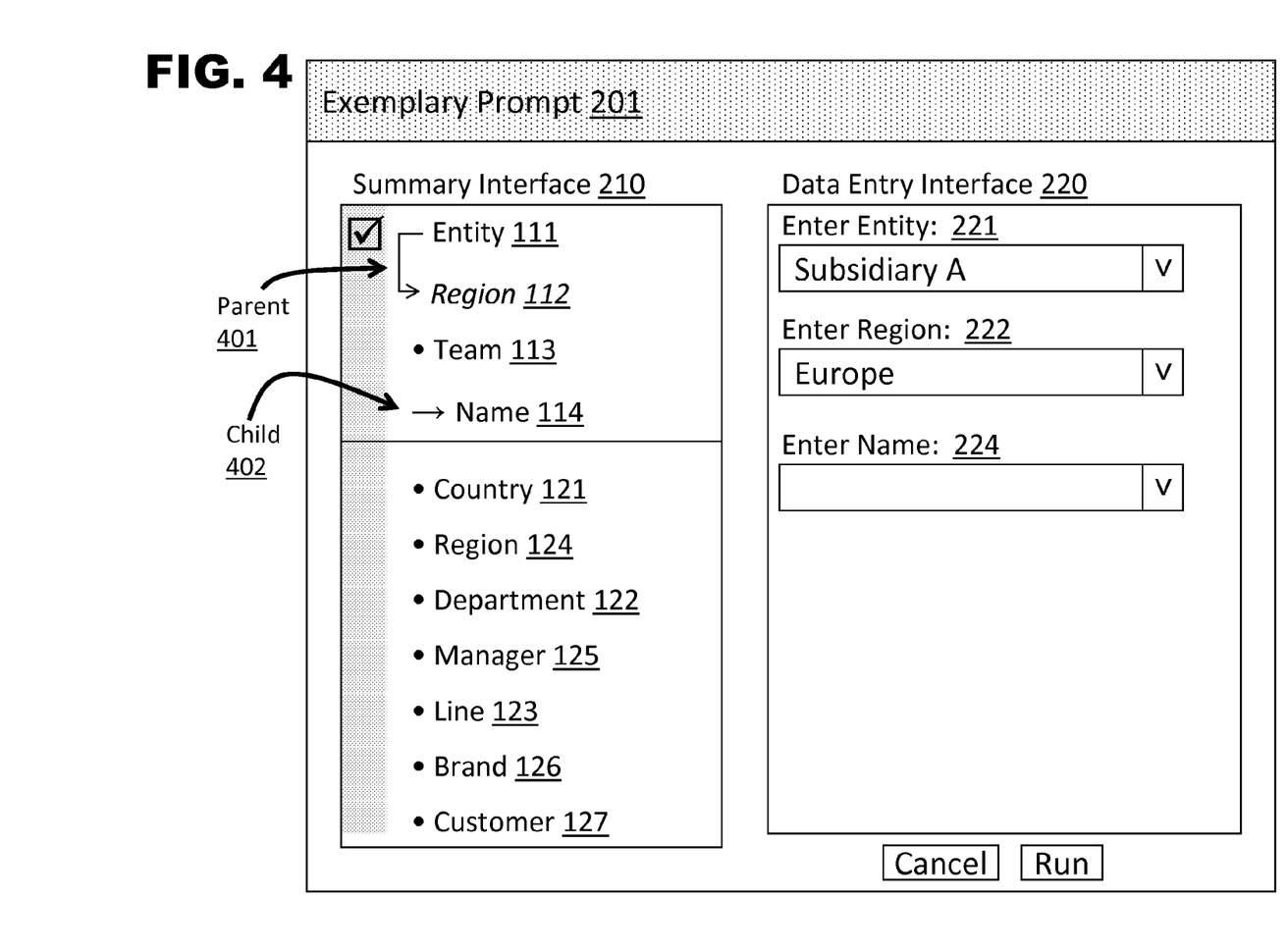
FIG. 4 shows an exemplary change in interfaces after selecting the region field in a summary interface of an embodiment.

FIG. 4 shows an exemplary change in interfaces after selecting the region field 112 in summary interface 210 of an embodiment. As discussed previously, in an embodiment of the invention, once a field in the summary interface is selected and becomes active, the summary interface 220 may be modified to visually indicate any immediate parent(s) and/or child (ren) of the active field. Thus, if region field 112 is selected in the summary interface 210, then the interface 210 may be modified to show its immediate parents and children.

Since, as indicated in FIG. 1, the region field has entity field 111 as its parent and name field 114 as its child, the interface may be modified to show the parent relationship 401 between entity field 111 (shown as a directional elbow arrow connector from the entity field 111 to the region field 112) and the selected region field 112, and the child relationship 402 with name field 114 (shown as being indented and preceded by an arrow). As discussed previously, other field differentiating techniques may also be used in different embodiments.

The data entry interface 220 may also be updated to show data entry fields corresponding to the selected field in the summary interface 210. Thus, data entry interface may show data entry fields for displaying, entering, or modifying data associated with parents (entity fields 111/221), children (name fields 114/224), or the selected field (region fields 112/222). In some embodiments, an indication may be used to demarcate those fields supplied with requisite information. For example, the check box next to the entity field in summary screen may indicate that a data selection of "Subsidiary A" has been selected for entity data entry field 221. Other indicators may be used in different embodiments, such as audible alerts, popup messages, color changes, visual cues, and so on. Some embodiments may not use indicators.

Figure 5:
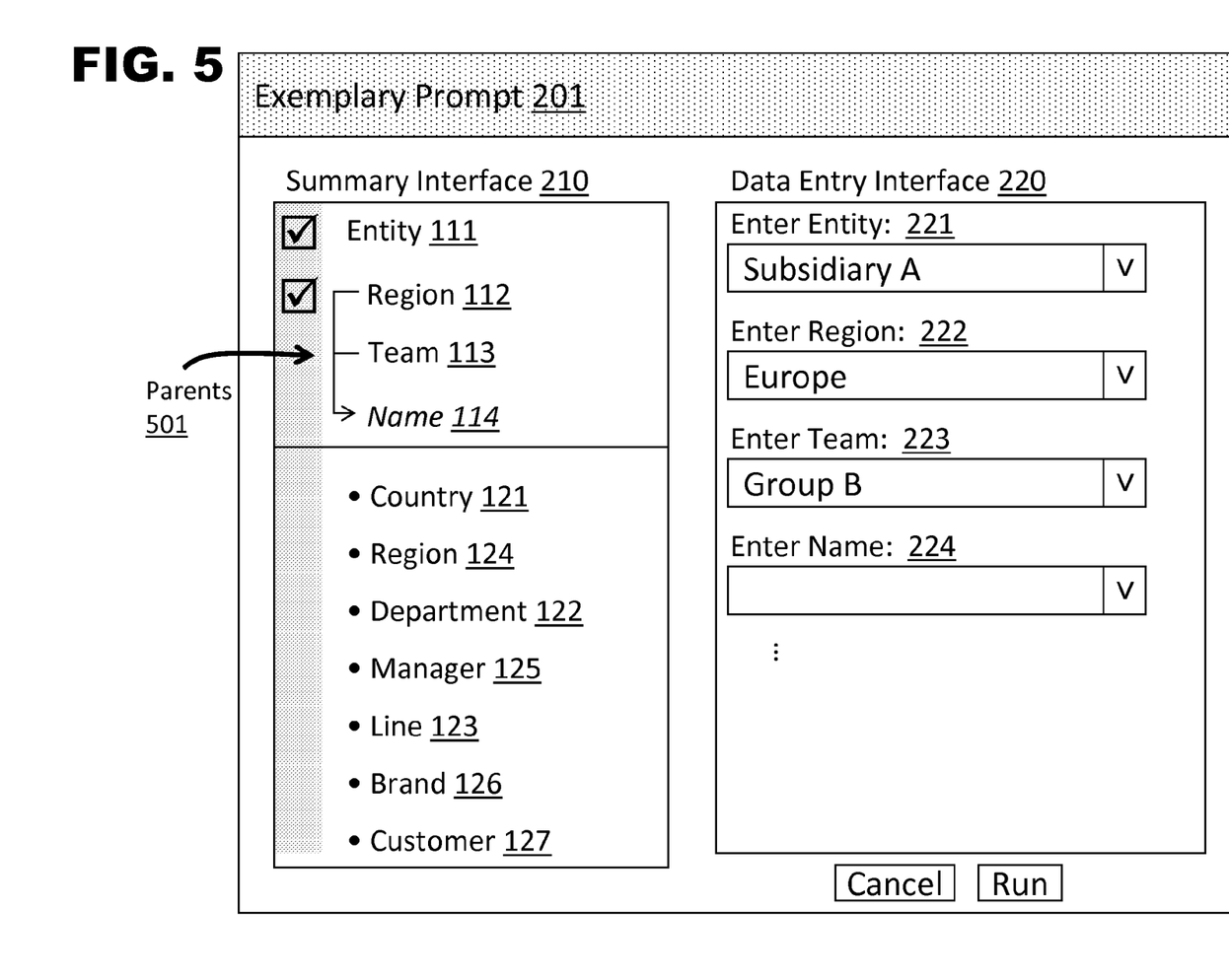
FIG. 5 shows an exemplary change in interfaces after selecting the name field in a summary interface of an embodiment.

FIG. 5 shows an exemplary change in interfaces after selecting the name field 114 in summary interface 210 of an embodiment. As discussed previously, in an embodiment of the invention, once a field in the summary interface is selected and becomes active, the summary interface 210 may be modified to visually indicate any immediate parent(s) and/or child (ren) of the active field. Thus, if name field 114 is selected in the summary interface 210, then the interface 210 may be modified to show its immediate parents and children.

Since, as indicated in FIG. 1, the name field 114 has both region field 112 and team field 113 as its parent and no child fields, the interface may be modified to show the parent relationship 501 between the selected name field 114 (shown as a directional elbow arrow connector from the region field 112 and team field 113 to the name field 114) and the region field 112 and team field 113. As discussed previously, other field differentiating techniques may also be used in different embodiments.

The data entry interface 220 may also be updated to show data entry fields corresponding to the selected field in the summary interface 210. Thus, data entry interface may show data entry fields for displaying, entering, or modifying data associated with an immediate parent/ancestor, such as region fields 112/222, and team fields 113/223, as well as the selected name field 114/224.

Figure 6:
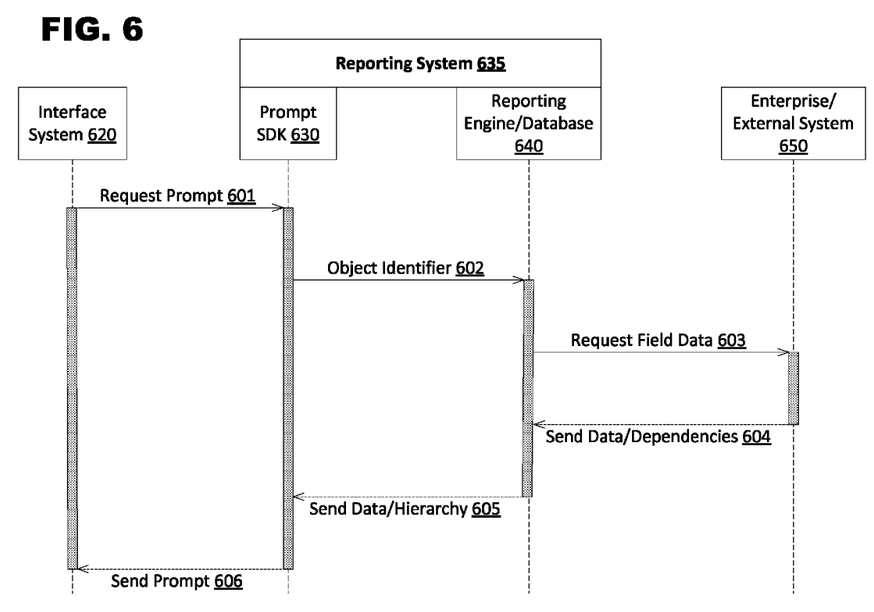
FIG. 6 shows exemplary communications between systems in an embodiment of the invention.

FIG. 6 shows exemplary communications between systems in an embodiment of the invention. An interface system 620 may be use to present prompts 201, summary interfaces 210, and data entry interfaces 220 to a user. An interface system 620 may be an end user system or other system that manages interactivity with data fields and objects, such as initially enable entry or changing of data through the data entry interface 220.

The interface system 620 may initiate a request 601 to generate a prompt 201. The request 601 may be initiated by a user or process running at the interface system 620. The request 601 to generate a prompt 201 may identify an object in the reporting system 635 on which the prompt is to be based. For example, if the prompt 201 is being requested for a particular data set, such as a particular report, analysis, or query, the request 601 may include an object identifier to identify the particular data set.

The request 601 to generate a prompt, which may include the object identifier, may be sent from the interface system 620 to a software development kit (SDK) 630 in a reporting system 635. Development tools provided as part of the SDK 630 may be used to parse the request 601 and identify the object on which the prompt may be based. The object may be a report, analysis, query, parameter, or other data structure used by the reporting system 635 or an enterprise system 650.

The reporting system 635 may then compare 602 the object identifier to those in a database 640 of the reporting system 635. The database 640 may contain a lookup table identifying a set data fields corresponding to the object. For example, if the object is a report, the lookup table may contain a list of data fields used in the report. The lookup system may also identify a source of the data fields, such as another system where the data fields may be stored.

For those data fields that are stored on an external or enterprise system 650 that may be independent of the reporting system, a request 603 to retrieve data from the data fields may be sent from the reporting system 635 to the external/enterprise system 650. The request may be generated and sent from a reporting engine 640 of the reporting system 635. If the data is stored in the reporting system database 640, then the data may be directly accessed from the database.

The external/enterprise system 650 may parse the request 603, retrieve the data stored in the identified data fields included in the request 603, and retrieve dependency information from a dependency record associated with the data field. In an embodiment, each data field may include a dependency record identifying other data fields that depend on the data field.

Once the data and dependency information has been retrieved by the external/enterprise system 650, the system 650 may send the data and dependency information for each of the data fields back to the reporting system 635.

The reporting engine 640 may use the dependency information to recreate a hierarchy of the data fields based on the dependency information sent from the external/enterprise system 650. The reporting engine may create the hierarchy by forming immediate parent-child relationships for each data field using the dependency information. For example, if the dependency information sent from the external/enterprise system indicates that a data field CITY depends on the data field REGION and the data field REGION depends on the data field COUNTRY, then the reporting engine may classify CITY data field as having parent field REGION, REGION field as having child field CITY and parent field COUNTRY, and COUNTRY field as having child REGION. These immediate parent-child relationships may be stored in the database 640 and/or sent 605 to the SDK 630 with the data 604 sent from external/enterprise system 650.

The SDK 630 may use the parent-child relationship information generated by the reporting engine 640 to create the prompt 201, summary interface 210, and data entry interface 220. The parent-child relationship information may be used to show immediate parent and/or child fields of a selected a data field in the summary interface 210. The parent-child relationship information may also be used in conjunction with data for each of the fields provided by the external/enterprise system 650 to identify those fields in the external system 650 with incomplete data or those fields with no data.

Those fields that are either lacking data or having incomplete data may be initially selected for display in the data entry screen. In additional to initially displaying those incomplete data fields for data entry in the data entry interface 220, in an embodiment one or more of the family members associated with the incomplete data field may also be displayed in the data entry interface 220. For example, all family member data field, such as all parent and ancestor data fields and/or all child and descendent data fields may be displayed in the data entry interface 220 along with the incomplete data field.

The summary interface 210 may also list either some or all family member fields, such as parent and/or other ancestor fields and/or child and/or other descendent data fields. Even if all family member fields are listed in the summary interface 210, only the immediate parent and/or children of a selected data field may be so designated in the interface 210 to avoid confusion and clutter.

In some embodiments, data fields and field families that are complete may not be displayed in the prompt 201, the summary interface 210, and/or the data entry interface 220 to enable quick entry of missing or erroneous data and avoid unnecessary clutter.

Figure 7:
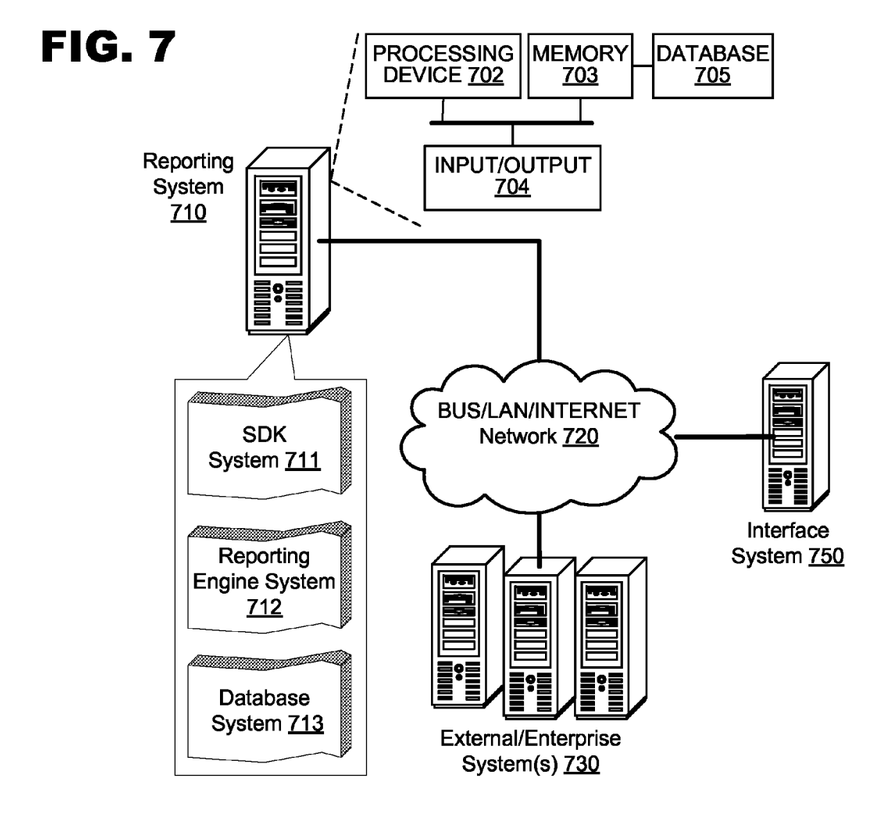
FIG. 7 shows an exemplary configuration of systems in an embodiment of the invention.

FIG. 7 shows an exemplary configuration of systems in an embodiment of the invention. In this example, a reporting system 710 may be coupled to an interface system 750 and other external/enterprise systems 730 through a communications network 720. The external/enterprise systems 730 may be third party systems, such as a systems supplied by third party entities to the reporting system 710, or other enterprise systems independent of the reporting system 710.

The reporting system 710 may include a software development toolkit (SDK) system to enable the creation, modification, and/or customization of prompts 201, summary interfaces 210, and data entry interfaces 220. The reporting system 710 may also include a reporting engine system 712 to process requests, generate hierarchies, lookup data, and communicate with other systems such as external systems 730 and a database system 713 to store lookup tables, data fields, hierarchy/data field dependency information, and other information.

Each of these systems 711 to 713 that are grouped as part of the reporting system 710, may actually be separate systems connected through the communications network 620 in some embodiments. In other embodiments some or all of these systems 711 to 713 may be components of a single integrated reporting system 750.

Each of the systems in FIG. 7 may contain a processing device 702, memory 703 containing a database 705, and an input/output interface 704, all of which may be interconnected via a system bus. In various embodiments, each of the systems 710 to 713, 730, and 750 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 703 may contain different components for retrieving, presenting, changing, and saving data. Memory 703 may include a variety of memory devices, for example, Dynamic Random Access Memory (DRAM), Static RAM (SRAM), flash memory, cache memory, and other memory devices. Additionally, for example, memory 703 and processing device(s) 702 may be distributed across several different computers that collectively comprise a system.

Processing device 702 may perform computation and control functions of a system and includes a suitable central processing unit (CPU). Processing device 702 may include a single integrated circuit, such as a micro-processing device, or may include any suitable number of integrated circuit devices and/or circuit boards working in cooperation to accomplish the functions of a processing device. Processing device 702 may execute computer programs, such as object-oriented computer programs, within memory 703.

Figure 8:
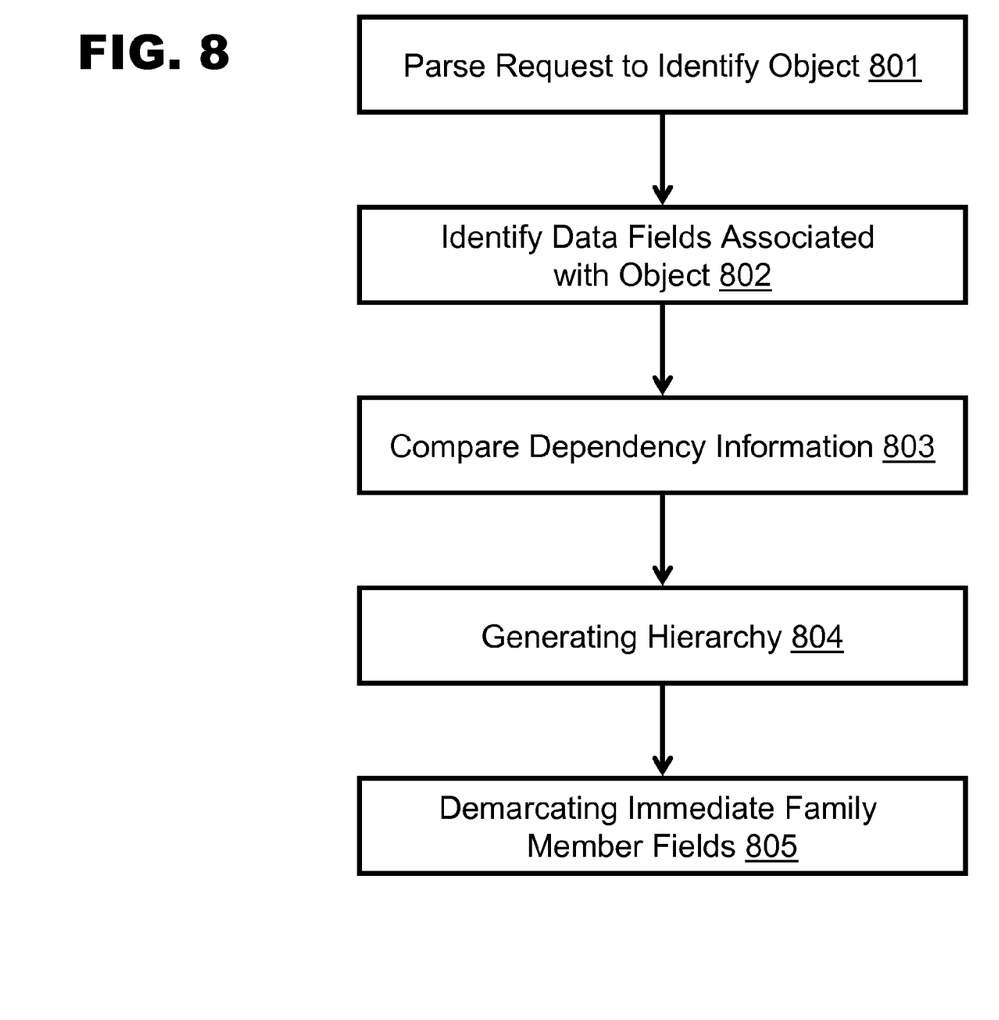
FIG. 8 shows an exemplary process in an embodiment of the invention.

FIG. 8 shows an exemplary process in an embodiment of the invention. In this exemplary process, a request may be generated at an interface system to generate a prompt interface for display data fields and entering data. In box 801, the request may be received at a data reporting system and parsed to identify an object associated with the data entry interface. In box 802, a data source may be accessed to identify data fields associated with the object. For example, a lookup table associating data fields with a particular object may be accessed to identify the associated data fields. In box 802 a query may also be generated to retrieve parental dependency information from a plurality of data fields associated with the identified object. In box 803, the retrieved parental dependency information of the plurality of fields may be compared. In box 804 a field hierarchy may be generated from the retrieved parental dependency information and each field may be associated with its immediate family fields in the hierarchy. In box 805, when a field in the interface is selected, immediate family fields associated with the selected field may be demarcated in the interface.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, hard disks, floppy disks, or CD ROM; the Internet or other propagation medium; or other forms of RAM or ROM.

We claim:

1. A method comprising:
    responsive to a request to generate a data entry interface, parsing the request to identify an object associated with the data entry interface;
    querying a data source to retrieve parental dependency information from a plurality of data fields associated with the identified object;
    comparing the parental dependency information of the plurality of fields to identify a field hierarchy using a processing device;
    displaying a prompt window containing a summary interface and a data entry interface as requested, the summary interface displaying each of the fields in a linear selectable list separate from the data entry interface, the data entry interface providing an interface for a user to enter or modify values associated with one or more fields displayed in the summary interface with child fields being demarcated to prevent data entry until data is entered in a respective parent field based on the field hierarchy;

responsive to a user selection of a field in the linear selectable list, demarcating any immediate parent fields and any immediate child fields in the linear selectable list of the user selected field based on the identified field hierarchy within the summary interface; and displaying in the data entry interface a data entry field for the user to enter or modify values associated with the user selected field and the immediate parent and child fields that are to be stored in the identified object.

2. The method of claim 1, wherein immediate parent fields are demarcated using a different demarcation technique than immediate child fields.

3. The method of claim 1, further comprising:
querying the data source to retrieve data from the plurality of data fields associated with the identified object;
analyzing the data from the plurality of data fields to identify those fields with incomplete data; and
selecting the fields with incomplete data for data entry in the interface.

4. The method of claim 3, further comprising: identifying, through the hierarchy, each of the fields in a same family as the selected incomplete fields; and further selecting the identified familial fields for data entry in the interface.

5. The method of claim 4, wherein fields that are ancestors of the selected incomplete field are in the same family as the selected field.

6. The method of claim 4, wherein fields that are descendants of the selected incomplete field are in the same family as the selected field.

7. The method of claim 3, wherein fields that are selected for data entry are sent to a data entry interface for data entry.

8. The method of claim 1, further comprising, when the identified field hierarchy requires parent fields to be entered before child fields:
waiting to display in the data interface the user selected field and any of its child fields until parent field data has been entered; and
waiting to display in the data interface any of the child fields until data of the user selected field has been entered.

9. The method of claim 1, further comprising:
retrieving, as part of the querying, each of the data fields included in a non-linear hierarchical relationship between data fields associated with the identified object;
initially displaying all the retrieved data fields in a single column one above another in the linear selectable list; and
after a user selects the user selected fields, only displaying in the data entry interface one or more data entry fields for the user to enter or modify values associated with the user selected field and the immediate parent and child fields of the user selected field that are to be stored in the identified object.

10. A reporting system comprising:
a software development kit (SDK) system including a processing device and a memory, to parse a prompt-creation request, identify a data source object from the parsed request, and generate a prompt window containing a summary interface and a data entry interface, the summary interface displaying each of the fields in a linear selectable list separate from the data entry interface, the data entry interface providing an interface for a user to enter or modify values associated with one or more fields displayed in the summary interface with child fields being demarcated to prevent data entry until data is entered in a respective parent field based on the field hierarchy;

a reporting engine system to identify a plurality of data fields associated with the identified source data object from a database system, generate a query to retrieve parental dependency information from the identified data fields, compare the parental dependency information of the plurality of fields to generate a data field hierarchy, display each of the fields in the linear selectable list within a prompt, demarcate any immediate parent fields and any immediate child fields in the linear selectable list of the user selected field based on the identified field hierarchy within the summary interface responsive to a user selection of a field in the linear selectable list, and display in the data entry interface a data entry field for the user to enter or modify values associated with the user selected field and the immediate parent and child fields that are to be stored in the identified object; and a communications interface to communicatively couple the SDK system, reporting engine system, and database system.

11. The reporting system of claim 10, wherein each demarcated immediate parent field is similarly demarcated using a different demarcation technique from each of the demarcated immediate child fields.

12. The reporting system of claim 10, wherein the generated query is sent to an external system through a communications network and the dependency information is received from the external system.

13. The reporting system of claim 10, wherein the reporting system generates a query to retrieve data from the plurality of data fields and analyzes the data from the plurality of data fields to identify those fields with incomplete data and the SDK system selects the fields with incomplete data for data entry in the interface.

14. A non-transitory computer readable device storing instructions that, when executed by a processing device, cause the processing device to:
responsive to a request to generate a data entry interface, parse the request to identify an object associated with the data entry interface;
query a data source to retrieve parental dependency information from a plurality of data fields associated with the identified object;
compare the parental dependency information of the plurality of fields to identify a field hierarchy using a processing device;
display a prompt window containing a summary interface and a data entry interface as requested, the summary interface displaying each of the fields in a linear selectable list separate from the data entry interface, the data entry interface providing an interface for a user to enter or modify values associated with one or more fields displayed in the summary interface with child fields being demarcated to prevent data entry until data is entered in a respective parent field based on the field hierarchy;
responsive to a user selection of a field in the linear selectable list, demarcate any immediate parent fields and any immediate child fields in the linear selectable list of the user selected field based on the identified field hierarchy within the summary interface; and display in the data entry interface a data entry field for the user to enter or modify values associated with the user selected field and the immediate parent and child fields that are to be stored in the identified object.

* * * * *